United States Patent Office 3,003,580
Patented Oct. 10, 1961

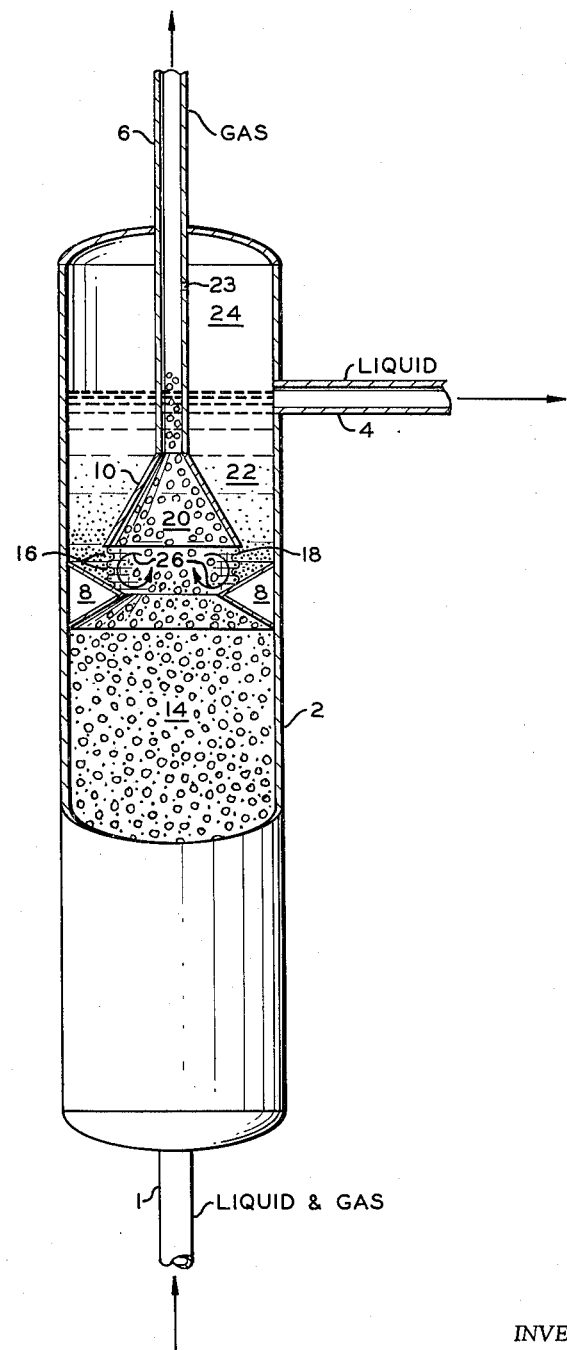

3,003,580
SEPARATION OF REACTION PRODUCTS OF
HYDROGENATION OF CRUDE OIL
William C. Lanning, Bartlesville, Okla., assignor to Phillips Petroleum Company, a corporation of Delaware
Filed Oct. 13, 1958, Ser. No. 766,791
8 Claims. (Cl. 183—2.5)

This invention relates to method and apparatus for separating finely subdivided solids from a mixture of liquid, gas and said solids. In one aspect the invention relates to the hydrogenation of crude petroleum oils in the presence of finely subdivided catalyst and the separation of said catalyst from gaseous and liquid reaction effluent.

Finely subdivided catalysts are often employed in reaction systems wherein liquids and gases are present. The catalyst being of small size is easily entrained in the reaction effluent. In many cases the catalyst is suitable for reuse without special treatment and it is desirable to operate in such a manner that all or the major portion of the catalyst is retained in the reaction zone.

It is an object of this invention to provide improved method and apparatus for separating solids from a flowing stream of liquid and gas.

Another object of the invention is to provide improved method and apparatus for separately recovering solids, liquid and gas from a flowing stream.

Still another object of the invention is to provide improved method and apparatus for recovering catalyst solids entrained in a reaction effluent mixture of liquid and gas.

These and other objects of the invention will become more readily apparent from the following detailed description and discussion.

The foregoing objects are realized broadly by passing a mixture of gas, liquid and finely subdivided solids upwardly through an elongated zone, and then through a region of reduced cross section into a conical zone axially disposed in said elongated zone, said conical zone terminating at the top in a region free from liquid and open at the bottom to the upflowing stream, and being spaced at the bottom from the region of reduced cross section and having a bottom periphery which encloses and lies outside the reduced cross section. The upflowing stream which passes into the conical zone disengages gas which is removed from the upper portion of the elongated zone. The solids and liquid pass through the region defined by the bottom of the conical zone and the region of reduced cross section into a more quiescent zone which is bounded by the exterior of the conical zone and the interior of the elongated zone. The region between the bottom of the conical zone and the zone of reduced cross section is sized such that the average linear velocity of the liquid passing therethrough is insufficient to entrain the solids. Thus, any solids which pass through this region by virtue of localized high velocity currents are returned to the main portion of the elongated zone below the region of reduced cross section. Liquid substantially free from solids is withdrawn from the quiescent zone.

In one aspect of the invention the solids-liquid mixture entering the quiescent zone passes through a plurality of passageways of reduced cross section which are disposed adjacent to the entrance to said zone.

In another aspect of the invention the level of liquid in said elongated zone is controlled by allowing unrestricted flow of liquid of reduced solids content removed from said quiescent zone.

The invention is best described by reference to the accompanying drawing which is a diagrammatic illustration in cross section of a separating apparatus suitable for carrying out the invention. Referring to the drawing, there is provided an elongated vessel 2 of substantially uniform cross section having a conduit 1 in communication with the lower portion of said vessel, a conduit 4 in communication with the upper side of said vessel, a conduit 6 in communication with the top of said vessel, a conical annulus 8 having its base disposed adjoining the inner surface of said vessel located in an intermediate portion thereof, a conical member 10 axially disposed in said vessel above said conical annulus terminating at the top as conduit 6, open at the bottom and having a bottom periphery which encloses and lies outside the passage bounded by annulus 8, and a screen 18 connecting the lower portion of conical means 10, adjacent to the bottom periphery thereof, and said annulus 8.

In the operation of this apparatus a liquid and gas, for example hydrocarbon and hydrogen, are introduced through conduit 1 to the bottom of vessel 2. The liquid-gas mixture can contain finely subdivided solids or these solids can be present in vessel 2 before the introduction of the liquid and gas. Conduit 4 through which liquid is removed from vessel 2 is sized to provide unrestricted flow so that a liquid level is maintained in vessel 2 adjacent to this conduit thus providing a liquid-gas-solids mixture 14 superposed by a vapor space 24. The velocity of liquid and gas entering and passing upwardly through vessel 2 is such that the solids contained therein are entrained in the moving stream. The gas which is in the form of bubbles or globules is directed by annulus 8 and screen 18, which preferably has openings of a cross section not exceeding the average diameter of the globules, into the open conical section 10, the gas being disengaged from the liquid and passing upwardly through the conical section and from vessel 2 through conduit 6. A vent opening 23 provides equalization of pressure between conduit 6 and vapor space 24.

The liquid portion of the upflowing stream passes through section 22, which is bounded by the bottom periphery of conical section 10 and the upper surface of annulus 8. This opening is sized to provide an average liquid velocity which does not exceed the entrainment velocity of the solid particles. Because of the turbulence and flow of liquid and solids at the region of screen 18, as shown by arrow 26, local, high velocity currents are formed and solid particles 16 are forced through the screen and upwardly with the liquid into section 22. However, since the average velocity of the liquid entering section 22 is less than the solids entrainment velocity, there is no net flow of solids into this region and any solids which accompany the liquid into section 22 separate therefrom and return to the main body 14 of liquid, gas and solids. The liquid passing upwardly through section 22 becomes progressively reduced in solids content and is substantially free from solids when it passes from vessel 2 to conduit 4.

While the preceding discussion has been directed to a preferred embodiment of the invention this is not intended in any limiting sense and it is within the scope of the invention to employ other suitable apparatus for carrying out the separation of solids from the flowing mixture of liquid and gas. For example, while the means for restricting flow through column 2 has been described as a conical annulus, it is within the scope of the invention to employ a baffle or other types of restricting means for this purpose. It is desirable for maximum effective separation of gas that a screen such as 18 be disposed between the bottom periphery of the conical member 22 and the conical annulus 8. However, effective separation can be obtained without the use of this screen. It is also within the scope of the invention to provide separate means for withdrawing liquid from the separating vessel and maintaining the desired liquid level in said vessel.

The invention, which is directed broadly to the separation of solids from gas-liquid mixtures, finds particular application in catalytic reactions wherein finely subdivided catalyst is entrained in a reaction effluent. More particularly, it finds application in processes wherein feed materials, such as crude petroleum, reduced or topped crude, high boiling tarry fractions, heavy gas oils, etc., are processed in the presence of a finely subdivided catalyst and hydrogen. The hydrogenation of crude petroleum oils is carried out usually over a broad range of pressures from 200 to as high as 5,000 p.s.i. and at temperatures from 650 to 1200° F. and preferably above about 700° F. The amount of hydrogen employed can vary from 1 to 20 mols per mol of oil and the reaction can be carried out with volumetric space velocities ranging from 0.5 to 1 to 4 to 1. A wide variety of catalysts can be employed in effecting the hydrogenation reaction, including nickel, cobalt, iron, as metals and/or oxides, nickel tungstate, cobalt molybdate, chromium, molybdenum, and tungsten oxides or sulfides, either alone or associated with carrier materials, such as alumina, silica, silica-alumina, etc. The products which are obtained from the hydrogenation of petroleum range from light gases through gasoline, distillates, gas oils, etc.

The following example is presented in illustration of an application of the invention to the hydrogenation of topped crude oil.

*Example*

Flows:
  Topped crude oil to reactor 1,
    catalyst [1] concentration, 0.20
    wt. percent_____ 400 b./h.
  Hydrogen to reactor 1_____ 1,200,000 s.c.f.h.
  Catalyst concentration in reactor _____ 8.0 wt. percent.
  Gas from reactor 6_____ 1,480,000 s.c.f.h.
  Liquid from reactor 4, catalyst concentration 0.33 wt. percent _____ 240 b./h.
Miscellaneous:
  Reactor temperature_____ 775° F.
  Reactor pressure_____ 1400 p.s.i.g.
  Superficial reactor liquid velocity _____ 0.5 ft./min.
  Superficial reactor vapor velocity _____ 40–80 ft./min.
  Liquid velocity entering quiescent zone_____ 2 ft./min.
  Catalyst particle size_____ 200 mesh and finer.

[1] Oxides of cobalt and molybdenum supported on alumina.

Having thus described the invention by providing a specific example thereof, it is to be understood that no undue limitations or restrictions are to be drawn by reason thereof, and that many variations and modifications are within the scope of the invention.

I claim:

1. A process for the separation of finely subdivided solids entrained in a flowing stream, comprising a mixture of liquid and gas, which comprises passing said solids-containing stream upwardly into an elongated zone, passing said stream through a region of said elongated zone having a reduced cross section intermediate the ends of said elongated zone, further passing said upflowing stream into a conical zone positioned intermediately within said elongated zone and above said reduced cross section, disengaging and removing gas from said stream by permitting said gas to flow through the top of the said conical zone and from the upper portion of said elongated zone, passing the upflowing solids and liquid through a region defined by the bottom of the said conical zone and the said region of reduced cross section into a quiescent zone, positioned outside said conical zone and within said elongated zone, maintaining the average linear velocity of the solids-liquid stream entering said quiescent zone not greater than the velocity at which solids settle from said solids-liquid stream, settling solids from the liquid in said quiescent zone and removing liquid of reduced solids content from said quiescent zone.

2. The process of claim 1 in which the solids-liquid mixture entering said quiescent zone passes through a plurality of passageways of reduced cross section disposed adjacent to the entrance to said zone.

3. The process of claim 2 in which the gas is present in the upflowing liquid-solids stream in the form of globules and the cross section of said passageways does not exceed the average diameter of the globules.

4. The process of claim 3 in which the level of liquid in said elongated zone is controlled by allowing unrestricted flow of liquid of reduced solids content removed from said quiescent zone.

5. Apparatus for separating finely subdivided solids entrained in a flowing mixture of liquid and gas which comprises an elongated reaction vessel, means for introducing liquid and gas to the lower portion of said vessel, means for separately withdrawing gas and liquid from the upper portion of said vessel, means for maintaining a liquid level in the upper portion of said vessel, a conical annulus in an intermediate portion of said vessel forming a region of reduced cross section, the base of which is contiguous with the inner surface of said vessel, a conical means positioned above said region of reduced cross section open at the top and bottom, terminating at the top above said liquid level, the bottom periphery of said conical means being of greater cross section than and enclosing said region of reduced cross section and a screen connecting the lower portion of said conical means, adjacent to the bottom periphery thereof, and said region of reduced cross section.

6. The apparatus of claim 5 in which the means for withdrawing liquid from the upper portion of said vessel is the means for maintaining the liquid level in the upper portion of said vessel.

7. Apparatus for separating finely subdivided solids entrained in a flowing stream comprising a mixture of liquid and gas which comprises an elongated reaction vessel, means for introducing fluid and solids into the lower portion of said vessel, means defining a region of reduced cross section in an intermediate portion of said vessel, a conical means positioned above said region of reduced cross section open at the top and bottom, the bottom periphery of said conical means being of greater cross section than and extending outside said region of reduced cross section, a screen connecting the lower portion of said conical means, adjacent to the bottom periphery thereof, and said means defining said region of reduced cross section, means for removing vapor through said conical means and from the upper portion of said vessel, and means for removing liquid from the upper portion of said vessel at a level below the top and above the bottom of said conical means.

8. Apparatus for separating finely subdivided solids entrained in a flowing stream comprising a mixture of liquid and gas which comprises an elongated reaction vessel, means for introducing fluid and solids into the lower portion of said vessel, a conical annulus defining a region of reduced cross section, the base of which is contiguous with the inner surface of said elongated vessel, a conical means positioned above said region of reduced cross section open at the top and bottom, the bottom periphery of said conical means being of greater cross section than and extending outside said region of reduced cross section, a screen connecting the lower portion of said conical means, adjacent to the bottom periphery thereof, and said means defining said region of reduced cross section, means for removing vapor through said conical means and from the upper portion of said vessel, and means for removing liquid from the upper portion of said vessel at a level below the top and above the bottom of said conical means.

References Cited in the file of this patent

UNITED STATES PATENTS

| | | |
|---|---|---|
| 1,095,463 | Kiese | May 5, 1914 |
| 1,539,671 | Holland et al. | May 26, 1925 |
| 1,840,079 | Bradley | Jan. 5, 1932 |
| 2,455,561 | Creelman | Dec. 7, 1948 |
| 2,768,935 | Watkins | Oct. 30, 1956 |
| 2,909,476 | Hemminger | Oct. 20, 1959 |

FOREIGN PATENTS

| | | |
|---|---|---|
| 843,842 | Germany | July 14, 1952 |